Jan. 12, 1960 C. J. LOMEN ET AL 2,920,664
TIRE DEMOUNTING STAND
Filed Aug. 13, 1958 3 Sheets-Sheet 1
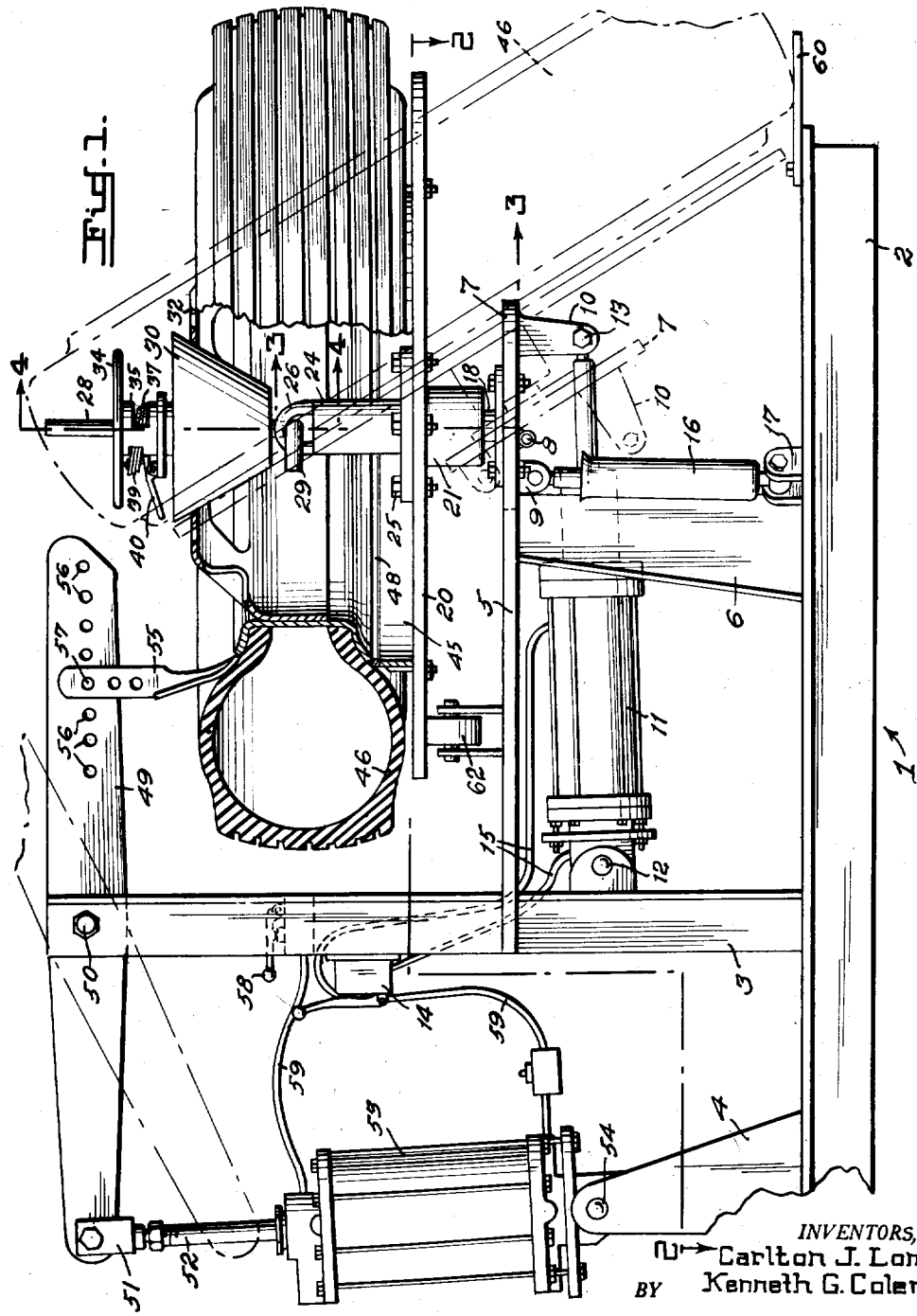
INVENTORS,
Carlton J. Lomen
Kenneth G. Coleman
BY
W. E. Thibodeau and A. J. Dupont Jan. 12, 1960   C. J. LOMEN ET AL   2,920,664
TIRE DEMOUNTING STAND
Filed Aug. 13, 1958   3 Sheets-Sheet 2
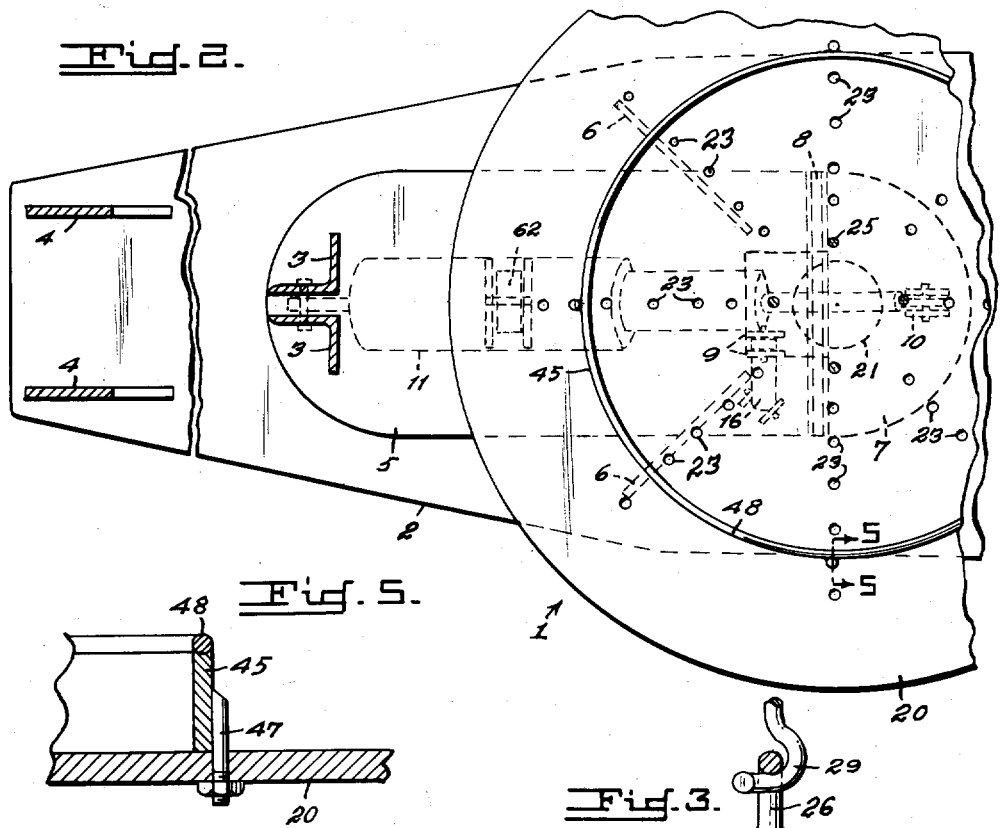
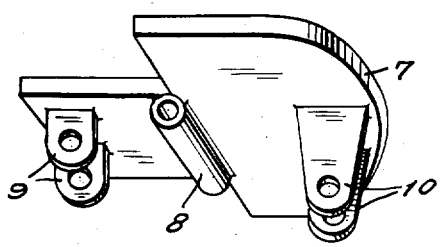
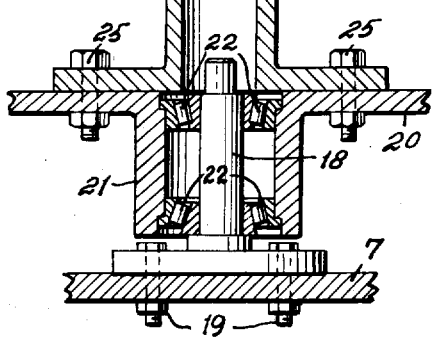
INVENTORS,
Carlton J. Lomen
BY Kenneth G. Coleman
W. E. Thibodeau and A. J. Dupont

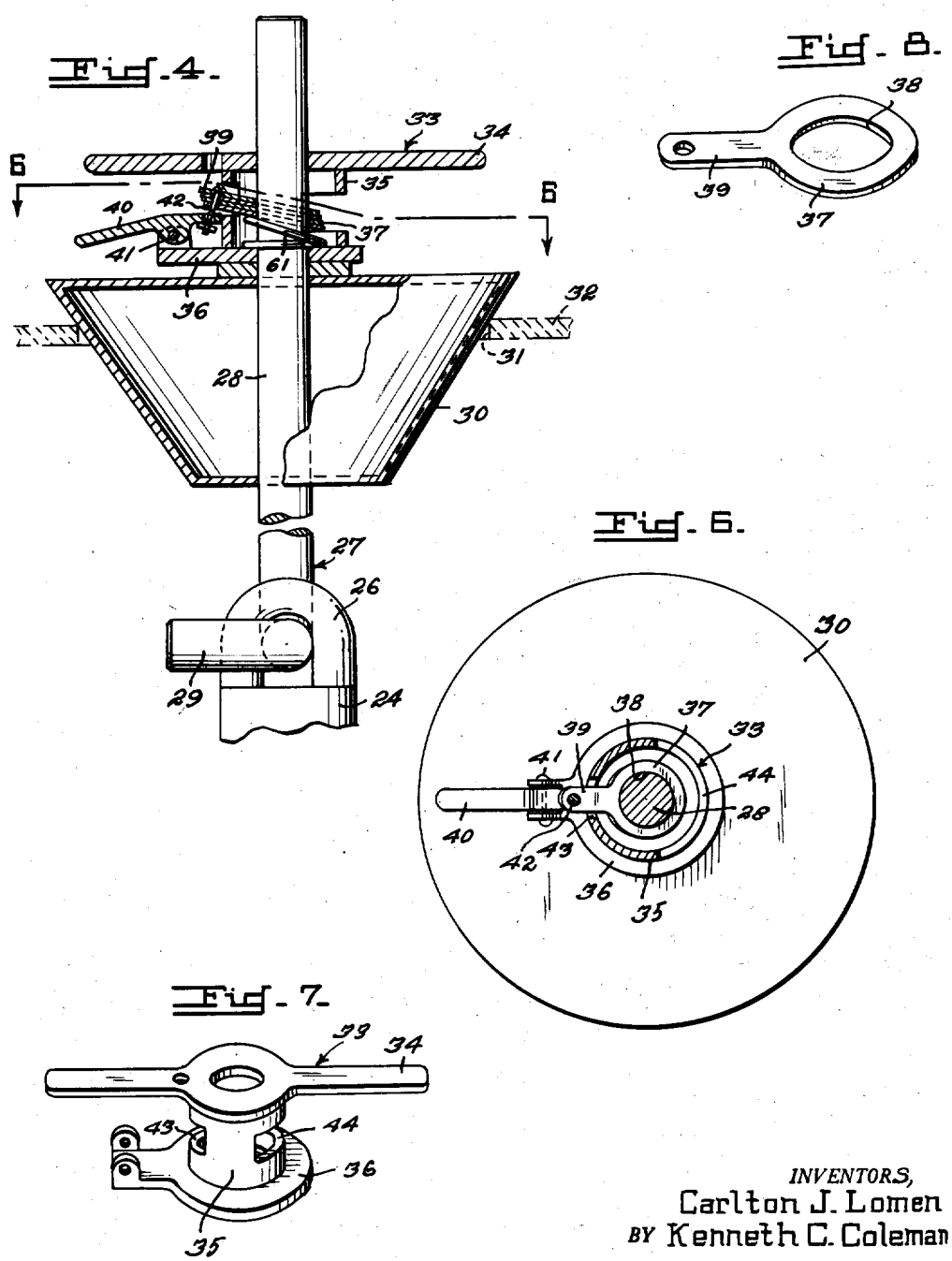

United States Patent Office 2,920,664
Patented Jan. 12, 1960

2,920,664

TIRE DEMOUNTING STAND

Carlton J. Lomen and Kenneth G. Coleman, Herlong, Calif.

Application August 13, 1958, Serial No. 754,902

3 Claims. (Cl. 144—288)

(Granted under Title 35, U.S. Code (1952), sec. 266)

The invention herein may be manufactured and used by or for the Government for governmental purposes without the payment to us of any royalty thereon.

This invention relates to a tire demounting device. More particularly the invention relates to an apparatus of the type in which a fluid actuated piston moves a lever having a tool attached thereon to exert pressure to break the tire casing from its rim and to a fluid operated means for elevating the tire and rim into a demounting position on the apparatus.

Pneumatic tire casings, particularly those of large size used on trucks and other large vehicles frequently adhere with great tenacity to the wheel rims on which they are mounted and therefore require great force to free the casing from its rim in the demounting process.

Prior art apparatus heretofore used in the demounting of heavy tires from rims have been highly successful and have been instrumental in preventing serious accidents incurred by the operators who perform these tasks. In addition to the tire demounting problem, the task of lifting the tire with its rim onto the apparatus for demounting and also off after completion of the demounting operation has also presented obvious difficulties. The present invention is designed to accomplish the tasks of demounting and handling of large truck tires by a single operator as opposed to prior art devices which required the handling by more than one operator.

It is therefore a primary object of this invention to provide an apparatus enabling a single operator to accomplish all the handling required to demount a large truck tire from its corresponding rim, in a most effective manner.

It is another object to perform the aforesaid operation by fluid actuated means.

It is a further object of this invention to provide a means to quickly and economically remove a tire from a rim.

The above mentioned and further objects and advantages of the invention and the manner of attaining them will be more fully explained in the following description taken in conjunction with the accompanying drawing in which:

Fig. 1 illustrates in elevation a tire demounting device consrtucted in accordance with the invention and depicting a tire and rim assembly mounted thereon for demounting, the spindle mount being indicated by broken lines in its tilted position, Fig. 2 is a sectional view taken along lines 2—2 of Fig. 1, Fig. 3 is a sectional view taken along lines 3—3 of Fig. 1, Fig. 4 is a section taken along lines 4—4 of Fig. 1, Fig. 5 is a section taken along lines 5—5 of Fig. 2, Fig. 6 is a section taken along lines 6—6 of Fig. 4, Fig. 7 is a perspective view of the clamp body, Fig. 8 is a perspective view of one of the clamps, and, Fig. 9 is a perspective view illustrating the under side of the spindle mount.

Referring to the drawings in which similar reference characters designate corresponding parts throughout the several views, all sectional views being taken looking in the direction of the small arrows at the ends of the section lines.

The tire demounter of the invention is indicated in its entirety by 1 and includes a frame comprising a base 2, a pair of parallel upright members 3 rigidly fixed to base 2, and a bracket 4 rigidly fixed to the rearward portion of base 2. A table 5 is rigidly fixed at its rearward end to uprights 3 and is supported at its forward end on a pair of webs 6 rising from base 2.

The table 5 is spaced above the base 2 at a convenient height for an operator to perform the tire demounting operation.

A spindle mount 7 is hingedly connected as at 8 to the forward portion of table 5 and is provided with downwardly depending ears 9 at its rearward end and a pair of downwardly depending ears 10 at its forward end thereof.

The spindle mount 7 is tilted by a fluid operated mechanism such as for example any hydraulic fluid or air under pressure which consists of piston assembly 11 pivotally connected at its rearward end as at 12 to uprights 3 and at its forward end as at 13 to ears 10. This assembly is disposed under table 5 and between webs 6. The piston assembly 11 is operated by valve 14 mounted on an upright 3 and is in communication with the piston assembly 11 by hose 15. Air or any fluid under pressure is supplied to valve 14 from a suitable source, not shown.

A shock absorber may be seen at 16 for easing the spindle mount 7 into its demounting position and into its tilted position. The shock absorber 16 is pivotally connected at its lower end to a pair of upstanding ears 17 which are rigidly mounted on the base 2, and at its upper end to ears 9 on the rearward underside of spindle mount 7.

A spindle 18 is rigidly fixed on spindle mount 7 by bolts 19 for tilting therewith. A circular table 20 is mounted for free rotation on spindle 18 by an axial downwardly depending tubular collar 21 integral to its under side thereof and bearings 22. Table 20 is provided with a series of radially extending symmetrically spaced holes 23. The functions of spindle 18, table 20 and holes 23 will be described later.

Means for securing a tire and rim assembly for demounting on table 20 are provided comprising a spindle cap 24 secured axially on table 20 by bolts 25 for rotation therewith, and having at its upper end an integral loop 26.

A cone hook generally indicated by 27, and defining a straight portion 28 and a hook portion 29 at its lower end, is provided for detachable engagement with loop 26 and receives a cone washer 30 in slidable engagement thereon. Cone washer 30 is designed to engage the central opening 31 of a vehicle rim 32.

Clamping means for securement of cone washer 30 to rim 32 is provided and consists of a clamp body indicated generally by 33, and including a handle 34, a tubular central portion 35 and a base portion 36. A plurality of clamp members 37, defining a ring portion having an opening 38 somewhat larger than the diameter of cone hook 27 and an extension 39 encircles hook 27 within tubular portion 35. A lever 40 is pivotally mounted on base 36 as at 41 and is connected at its inner end to clamp extensions 39 of members 37 by bolt 42.

Openings 43 and 44 are provided in tubular portion 35 for assembling the clamp members in the body 33. The clamp members 37 are placed in body 33 through hole 44 and the extensions protrude through hole 43 for connection to lever 40. A spring 61 is placed between clamp members 37 and the bottom of tubular portion 35. The entire assembly may be slid on the hook 27.

In order that the bottom bead of the tire may be broken from the rim at the same time that the upper bead is separated, a support ring 45 is provided and has a rounded rim portion 48. (See Fig. 5.) This ring is provided with bolts 47 secured to the periphery of ring 45 in spaced relation whereby they will be received in holes 23 of round table 20. Rings of varying diameters will be used corresponding to the size of the tire to be demounted.

Means for breaking the tire casing 46 from rim 32 are provided and consists of an arm 49 which is pivoted between the upper ends of uprights 3. Its rearward end is pivotally connected by a clevis 51 to a piston rod 52 of a second fluid cylinder and piston assembly 53. Assembly 53 is pivotally mounted at its lower end as at 54 to bracket 4. A suitable tool 55 is attached in one of a series of holes 55 in the forward portion of arm 49 by bolt 57.

A second valve 58 for operating the second assembly 53 is mounted on uprights 3 and is connected for operation, to the assembly 53 by hose 59.

The operation of the tire demounter is best understood from viewing Fig. 1 wherein the position of the spindle mount is illustrated in broken lines in its tilted position and ready for a tire and rim assembly to be mounted thereon for demounting. The tire and rim assembly is rolled onto table stop 60 which is a piece of metal secured to the forward edge of base 2. Then the elements shown in Fig. 4 are assembled and placed through the central opening 31 in rim 32 and the hooked portion 29 of the cone hook is connected to the loop 26 of spindle cap 24. The cone washer 30 is slid downward until it rests on the peripheral edge of opening 31. The clamp assembly is slid down until it rests on cone washer 30 and the operator presses downward on handle 34 so that tire 46 will be held firm against ring 45 on table 20. The clamps 37 will resist any upward movement of cone washer 30 due to the inclined position of clamps 37 as seen in Fig. 4 which is due to the clamps 37 riding on the bottom edge of opening 43. This tends to force the clamps 37 upwardly at one end and causes them to frictionally engage the cone hook 28 and prevent them sliding upward, thus securing the tire and rim assembly firmly to the round table 20.

The operator now opens the valve 14 to cause spindle mount 7 and table 20 to rotate into demounting position in which it rides on a supporting roller 62 on table 5. When table 20 is in demounting position, the tool 55 is bolted to a hole 56 in order that the tool will be in a selected position to break the bead from tire 46. Valve 58 is now opened and a portion of the tire bead will be broken away from the tire. The valve 58 is closed and the arm rises up, permitting the operator to rotate the tire 46 to another position and the operation repeated until the entire casing is loose on the rim. The bottom bead will be broken from the rim by the pressure exerted by the arm 49 and tool 55 and the rounded rim 48 of the support ring 45.

After the casing 46 is free of the rim, valve 14 is closed and the spindle mount will tilt into its previous position. The operator then grasps the handle 34 and lever 40 and squeezes until the clamps 37 are freed from the hook 27 and the clamp assembly will slide upward whereby it is removed and the cone hook 27 is detached from loop 26 and withdrawn and the tire and rim is then removed.

From the above detailed description of the invention, it is believed that the construction, use, and operation thereof will at once be apparent, and while there is herein shown and described the preferred embodiment of the invention, it is nevertheless to be understood that minor changes may be made therein without departing from the spirit and scope of the invention as claimed.

What is claimed is:

1. In a device for breaking a tire casing from a rim, a work supporting structure comprising a base, a pair of parallel uprights rigidly secured to said base, a pair of upright webs rigidly secured to said base and disposed forwardly of said uprights, a first table rigidly fixed to said uprights at its rearward end and at its forward end upon said webs, a spindle mount pivotally connected to said table, a spindle rigidly fixed on said spindle mount, a fluid operated means for tilting said spindle mount pivotally connected to said uprights and said spindle mount, a second table rotatably mounted on said spindle, a spindle cap centrally fixed on said second table and in axial alignment with said spindle, said spindle cap defining an integral loop at its upper end thereof, a support ring having a rounded rim detachably mounted in concentric relation with said spindle cap on said second table and adapted to support a vehicle tire thereon, means to secure a tire and rim assembly on said support ring on said table comprising a cone hook defining a straight portion and a hook portion, said hook portion adapted to engage said loop on said spindle cap, a cone washer adapted to be slidably received on said cone hook and engage the peripheral rim of the central opening of a vehicle tire rim, means adapted to prevent said washer from axial movement in one direction on said cone hook comprising a clamp body defining a handle portion, a tubular portion and a base portion, a series of spring biased clamp members having central openings of somewhat larger diameter than said cone hook and having extensions adapted to extend through an opening in said tubular portion and a lever pivotally mounted on said base portion and connected to said extensions on said clamp members, and means for securing a tire pressing tool mounted between said uprights at their upper ends thereof, said last-named means to apply pressure on said tire assembly whereby said tool and said support ring cooperate to loosen both beads of said tire from said casing simultaneously.

2. In a device for freeing the beads of a tire casing from a rim including a supporting structure and a mechanism associated with said structure adapted to apply force to one side of said tire casing whereby both beads of said casing are freed from said rim, the combination of a means to elevate an assembled tire and rim into a position for said force application comprising a spindle mount hingedly connected to said structure, a fluid operated mechanism pivotally connected at its rearward end to said structure and at its forward end to said spindle mount, said fluid mechanism adapted to hold said spindle in a horizontal position or lower it to an inclined position, a spindle centrally fixed on said spindle mount, a work supporting table rotatably mounted on said spindle, there being a series of symmetrically spaced radially disposed holes in said table, a tire supporting ring having a rounded rim, a plurality of circumferentially spaced downwardly depending bolts adapted to be received in said holes in said table whereby said ring is mounted on said table in concentric relation with said spindle, a spindle cap fixed to said table concentric with said spindle, said spindle defining a loop at its upper edge, and a means for the securement of a tire and rim on said support ring on said table comprising a shaft having a hook portion at one end thereof for engagement with said loop, a cone washer slidably received on said shaft, said washer adapted to engage the central opening of a rim, a clamp body slidably received on said shaft above said washer, a series of clamp members slidable on said shaft and disposed within said clamp body and a lever pivotally mounted on said clamp body and connected to said clamp members.

3. In a tire demounter for freeing a tire casing from a rim, a supporting structure for said mechanism comprising a base, a first pair of uprights secured to said base, a second pair of uprights having a height substantially less than said first pair of uprights, a table secured at its rearward end to said uprights and at its forward end on said second uprights, a bracket secured to said base and spaced rearwardly from said first uprights, a spindle mount hingedly mounted to the forward end of said spindle mount, a fluid operated means carried by said structure adapted to rotate said spindle mount, a spindle secured to said spindle mount, a disc rotatably mounted on said spindle, a spindle cap centrally secured to said disc and in axial alignment with said spindle, said disc being provided with a series of symmetrically spaced radially disposed holes, a supporting ring defining a rounded upper peripheral surface and being provided with a series of circumferentially spaced downwardly depending bolts adapted to be received in said holes in said disc for coaxial securement of said ring on said disc, a clamping assembly adapted for attachment to said spindle cap for the securement of a tire and rim assembly on said ring, and a means for securing a tire removing tool mounted between the upper ends of said first uprights, to apply pressure to one side of said tire and cooperate with said support ring to simultaneously separate both beads of said tire from said rim.

References Cited in the file of this patent

UNITED STATES PATENTS

| | | |
|---|---|---|
| 2,213,535 | Seip | Sept. 3, 1940 |
| 2,536,139 | Ritter | Jan. 2, 1951 |
| 2,595,258 | Hildred | May 6, 1952 |
| 2,609,038 | Henderson | Sept. 2, 1952 |
| 2,655,984 | Lowrey | Oct. 20, 1953 |
| 2,720,915 | Lenoir | Oct. 18, 1955 |
| 2,749,156 | Curtis | June 12, 1956 |